US007484607B2

(12) United States Patent
Schneider et al.

(10) Patent No.: US 7,484,607 B2
(45) Date of Patent: Feb. 3, 2009

(54) TORSIONAL VIBRATION DAMPER

(75) Inventors: Hans-Jürgen Schneider, Werneck-Stettbach (DE); Thomas Walter, Kolitzheim (DE); Alexander Markow, Schweinfurt (DE); Thomas Dögel, Bad Kissingen (DE); Wolfgang Grosspietsch, Schweinfurt (DE); Rainer Brand, Grettstadt (DE); Hilmar Göbel, Grafenrheinfeld (DE); Reinhard Feldhaus, Euerbach (DE); Jürgen Weth, Niederwerrn (DE); Stefan Zopf, Geldersheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 344 days.

(21) Appl. No.: 11/365,078

(22) Filed: Mar. 1, 2006

(65) Prior Publication Data
US 2006/0196751 A1    Sep. 7, 2006

(30) Foreign Application Priority Data
Mar. 1, 2005    (DE) ................... 10 2005 009 187

(51) Int. Cl.
*F16F 15/121* (2006.01)
(52) U.S. Cl. .................. 192/55.61; 192/213.1
(58) Field of Classification Search ............... 192/55.3, 192/55.4, 55.61, 70.17, 87.11, 87.15, 208, 192/213.1; 74/330
See application file for complete search history.

(56) References Cited
U.S. PATENT DOCUMENTS 2,282,591 A *   5/1942   Orr ........................... 74/364
5,307,710 A     5/1994   Feldhaus et al.
6,401,894 B1    6/2002   Merkel et al.
6,622,839 B2 *  9/2003   Kundermann et al. ...... 192/48.9
6,830,139 B2 * 12/2004   Carlson et al. ............. 192/48.8
6,889,811 B2 *  5/2005   Ebert et al. ............... 192/87.13
7,063,195 B2 *  6/2006   Berhan ...................... 192/48.8
7,143,879 B2 * 12/2006   Ackermann et al. ........ 192/3.29
7,147,095 B2 * 12/2006   Kraxner et al. ........... 192/87.15
7,267,211 B2 *  9/2007   Yamashita et al. ......... 192/3.29
7,287,634 B2 * 10/2007   Agner et al. ............. 192/87.11
7,322,455 B2 *  1/2008   Vetter et al. ................ 192/48.9
7,341,523 B2 *  3/2008   Heidingsfeld ............... 192/208

FOREIGN PATENT DOCUMENTS

DE          100 34 730      8/2001
DE       10 2004 007 337    9/2004
GB           2 145 495       3/1985

* cited by examiner

*Primary Examiner*—Rodney H Bonck
*Assistant Examiner*—John V Ligerakis
(74) *Attorney, Agent, or Firm*—Cohen Pontani Lieberman & Pavane LLP

(57) ABSTRACT

A torsional vibration damper in a gearbox housing has an input part connected to a drive and acts on a first damping unit and an intermediate part which acts as the output of the first damping unit and as the input of a second damping unit. The torsional vibration damper further has an output part which is in working connection with the second damping unit and which is designed to accept a takeoff. Takeoff-side drive elements of the intermediate part, the second damping unit, and the takeoff are mounted in a torque-transmitting space of a clutch device, which space is provided with at least one inlet and at least one outlet. A sealing wall separates the torque-transmitting space from a damping space including the first damping unit.

14 Claims, 1 Drawing Sheet

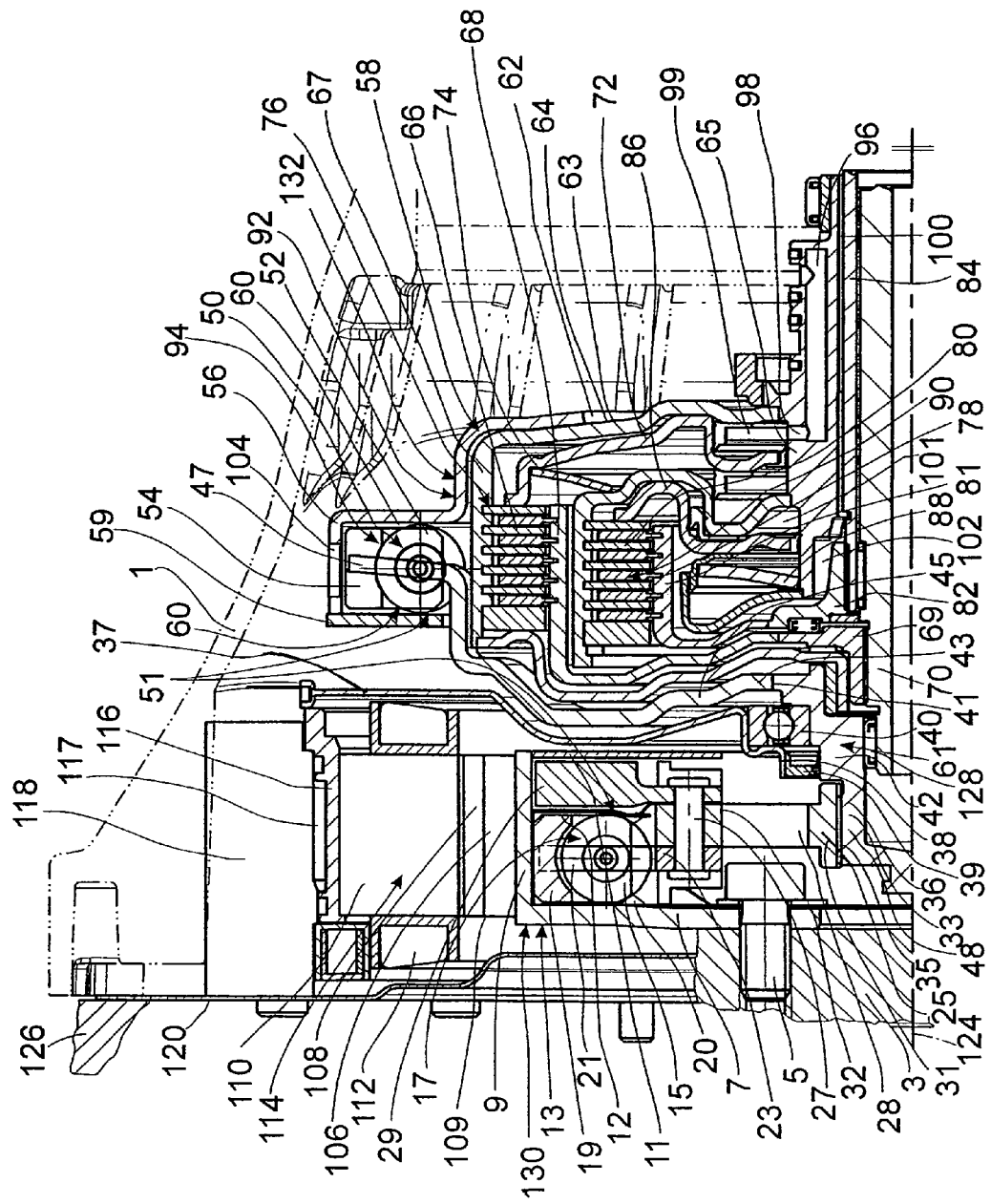

TORSIONAL VIBRATION DAMPER

BACKGROUND OF THE INVENTION

1. Field of the Invention

The invention relates to a torsional vibration damper in a gearbox housing.

2. Description of the Related Art

DE 10 2004 007 337 A1 describes a torsional vibration damper of the type which is usually mounted in a gearbox housing. A damping device is formed here by two damping units, which are axially offset from each other and which are connected to form a series connection. So that the torque present at a drive such as the crankshaft of an internal combustion engine can be transmitted to the damping device, an input part is attached to the drive. This input part has first actuating elements, each of which acts on a damping element of the first damping unit. The damping elements of the first damping unit are supported in turn against drive-side drive elements. Like the takeoff-side drive elements, each of which acts on a damping element of the second damping unit, the drive-side drive elements are a component of an intermediate part. The intermediate part formed by at least one hub disk-shaped, drive-side section, by a takeoff-side section, formed by two cover plates, and by a connecting section, which connects the two other sections of the intermediate part to each other in the axial direction. When torque is introduced to the damping elements of the second damping unit, this unit acts on the second actuating elements of a hub disk located radially on the outside, which acts as the output part and which is connected to a takeoff, which, for example, can be used to accept a clutch device.

The two damping units of the torsional vibration damper, which are axially offset from each other, are at least approximately equal radial distances away from the axis of rotation common to both damping units. These radii are comparatively small and are predetermined by the amount of radial space available, which is limited for the damping unit on the drive side by a starter-generator, which radially surrounds the damping unit. The small radial dimension of the torsional vibration damper allows optimal use to be made of the area radially inside the starter-generator unit, but the deformation volume available in the circumferential direction to both damping units is limited, which means that, even though the damping device has two damping units, there is still not much freedom of relative rotation available between the takeoff and the drive. As a result, the decoupling quality of the torsional vibration damper is limited, especially since only the first damping unit is located in a damping space partially filed with viscous medium so that it can provide velocity-proportional damping, whereas the second damping unit is of the so-called "dry" type and cannot provide damping of this type. The advantages of the compact dimensions, therefore, are outweighed by the disadvantage of the limited decoupling behavior.

U.S. Pat. No. 6,401,894 also describes a torsional vibration damper installed in a gearbox housing. This damper cooperates with a takeoff in the form of a clutch device with two clutch units. A clutch device of this type is usually referred as a "dual clutch" in professional circles. In contrast to the damping units of the previously described DE 10 2004 007 337 A1, the torsional vibration damper discussed in U.S. Pat. No. 6,401,894 is installed together with the clutch device in a torque-transmitting space, through which a fluid flows. This fluid thus not only provides a cooling function for the clutch units but also serves to act as a velocity-proportional damping medium when the torsional vibration damper is subjected to torsional vibration-induced forces. Although the radial distance of the damping unit of the torsional vibration damper discussed here from the axis of rotation is comparatively long, only the volume of this single damping unit is available for deformation. In addition, this torsional vibration damper is unsuitable in particular for small spaces, because, in addition to taking up a considerable amount of space in the radial direction, it also fails to show that any effort has been made to limit the amount of space it requires in the axial direction. More favorable in this respect is the torsional vibration damper proposed in DE 100 34 730 A1, FIG. 22. Because this damping unit is mounted on a small radius around the axis of rotation, however, it must be expected that the quality of the decoupling function of this single damping unit will be inadequate because of the small deformation volume available to its damping elements in the circumferential direction.

A clutch device operated in accordance with GB 2 145 495 also appears suitable for extremely small spaces. Here a torsional vibration damper is omitted, and the torsional vibrations are damped only by intentionally allowing the clutch to slip. Even in this arrangement, however, it is acknowledged that this approach to vibration damping should be limited to only small amounts of slippage on the order of less than 100 rpm in order to exclude the negative effects on the clutch device which might result from the generation of too much heat. It is thus possible to conclude that this type of slip control quickly reaches the limits of its functionality upon the occurrence of strong torsional vibrations.

SUMMARY OF THE INVENTION

The invention is based on an object of designing a torsional vibration damper in such a way that, first, it makes optimum use of the available space and that, second, it guarantees a decoupling function of very high quality.

This object is accomplished according to the invention by a torsional vibration damper for mounting in a gearbox housing. The torsional vibration damper includes a first damping unit disposed in a damping space which is free of fluid feed and discharge lines; an input part connecting the first damping unit to a drive; a second damping unit; an output part connecting the second damping unit to a takeoff; and an intermediate part comprising drive-side drive elements connected to the first damping unit, and takeoff-side drive elements connected to the second damping unit. The takeoff-side drive elements, the second damping unit and the takeoff are mounted in a torque-transmitting space of a clutch device. The torque transmitting space is provided with at least one fluid inlet and at least one fluid outlet.

The inventive torsional vibration damper has a damping device with two damping units, which are connected to each other in series by an intermediate part. Thus, simply because of the number of damping units, it is possible to guarantee that there will be a large circumferential deformation volume available for the damping elements of the two damping units. In addition, the torsional vibration damper has the special feature that at least one damping unit, optimally in the present case the second damping unit, is installed in a torque-transmitting space of a clutch device together with the takeoff and the takeoff-side drive elements of the intermediate part which act on this damping unit, where the torque-transmitting space has at least one fluid inlet and at least one fluid outlet. This fluid, which is initially intended merely to cool the clutch units of the clutch device, also functions as a displacement medium for the damping unit installed in the torque-transmitting space during the torsional vibration-induced deformation of the damping elements in the circumferential direction, as a result of which extremely efficient velocity-proportional damping is obtained. The damping device would therefore offer a decoupling function of very good quality even if it included only this second damping unit, and if this damping unit were located far out in the radial direction, preferably even radially outside the clutch device, the performance would be even better. By arranging the second damping unit in such a way that most or all of it overlaps the clutch device in the axial direction, furthermore, an especially optimized design is obtained with respect to the use of the available axial space. If the second damping unit is also designed to cooperate with a starter-generator unit, the damping unit can be mounted at such a large radial distance from the axis of rotation of the damping device that most or all of it coincides with the radial dimension of the starter-generator unit.

According to the invention, this damping unit, which is optimized with respect to decoupling quality, is combined with another damping unit, referred to as the "first" damping unit in the detailed description of the currently preferred embodiment of the invention, the first damping unit being preferably a shorter radial distance away from the axis of rotation of the damping device than the second damping unit, and thus, although the deformation volume available to its damping elements in the circumferential direction is smaller, it requires only a limited amount of space in the radial direction and possibly also in the axial direction. A space of this type, referred to in brief below as the "problem space", is present, for example, when drive shafts or takeoff shafts are present which pass through the gearbox housing, or when a starter-generator unit is used, especially a unit with an internal rotor. In the latter case, the inside diameter of the rotor predetermines the radial dimension of the problem space, and the axial dimension of the rotor predetermines the axial dimension of the problem space. If now, because of its radially and/or axially compact design, the first damping unit can be installed in this problem space, it will improve the overall decoupling quality of the torsional vibration damper. Even though its deformation volume is small, it is connected in series to the second damping unit and will therefore provide a noticeable increase in the total amount of deformation volume present in the damping device.

Although fluid does not, according to the invention, flow through the first damping unit, velocity-proportional damping can still be obtained from the first unit by installing it in a damping space which is at least partially filled with viscous medium, such as a high-viscosity grease.

The intermediate part which brings the two damping units into working connection with each other can be a separate element of the inventive torsional vibration damper, as will be explained below. In a preferred embodiment, the intermediate part has a connecting section with a radial area in the center, which is advantageously only a short distance away from the axis of rotation. Proceeding from this connecting section are other sections of the intermediate part, which extend toward the associated damping units essentially in the radial direction. Whereas it is easy for the drive elements of the intermediate part sections to reach even radially distant damping units, the radial area in the center of the connecting section, because of its comparatively small diameter around the axis of rotation, can fit inside an opening in a sealing wall. Because one radial side of this sealing wall is positioned on the gearbox housing and the other radial side is positioned on the radial area in the center of the connecting section, the sealing wall effectively ensures that the fluid present in the torque-transmitting space will not be able to escape through an unintended route. In addition, the measures undertaken to support the connecting section and to seal the gap in the area of the opening in the sealing wall can be a short distance away from the axis of rotation and thus produced at low cost. The contact zone between the sealing wall and the connecting section therefore represents a "penetration area", which is preferably used to accommodate a bearing to center the connecting section in the sealing wall and to hold a seal, which acts between the torque-transmitting space and the space on the opposite side of the sealing wall, i.e., the space which holds the first damping unit. Because no fluid flows through this space, it is called the "dry" space.

As previously mentioned, the sections of the intermediate part extend essentially in the radial direction from the connecting section. One section of the intermediate part, preferably the takeoff-side section, is designed as an integral part of, or is fastened to, the connecting section, whereas the other part of the intermediate section, preferably therefore the drive-side section of the intermediate part, is mounted on the connecting section in a detachable manner such as that provided by sets of teeth. The first step of the production process, therefore, will be to attach the damping space holding the first damping unit to the drive, such as the crankshaft of an internal combustion engine, by means of fastening means such as crankshaft screws. Then the torque-transmitting space holding the second damping unit can be pushed in axially toward the damping space, so that the connecting section "penetrates" into the drive-side section of the intermediate part until a final connection has been established. The detachable connection between the connecting section and the other section of the intermediate part is accomplished by sets of teeth, ideally by sets of axial teeth, which, as is well known, allow relative movement in the axial direction but prevent relative rotation in the circumferential direction. Designed in this way, the two damping units can be easily prefabricated, and the two modules can then be easily joined to form a single overall unit. As a result of this design, and especially when there is some radial play in the detachable connection, the advantage is obtained that wobbling movements of the damping space are at least significantly decreased before they arrive at the torque-transmitting space, and thus the loads on the bearings there are considerably reduced.

Elaborations, which are intended to optimize the torsional vibration damper even more, are also disclosed. For example, because the connecting section is designed with a small diameter around the axis of rotation, only the two sections of the intermediate part which connect the two damping units to each other have large radial dimensions. This means that the intermediate part has a very low mass moment of inertia, which is a desirable feature for the vast majority of power trains in motor vehicles.

Especially when a starter-generator unit designed with an internal rotor is present, the primary-side mass moment of inertia assigned to the drive can already be comparatively high because of the internal rotor. If the drive, here especially the crankshaft of an internal combustion engine, introduces a mass moment of inertia of, for example, 0.08-0.09 kgm$^2$, the internal rotor will add to that its own mass moment of inertia of approximately 0.05 kgm$^2$. In contrast, the mass moment of inertia between the two damping units of the damping device, i.e., that which is present at the intermediate part, is relatively low with a value of only about 0.015 kgm$^2$. The damping space accounts for approximately ⅔ of this, the torque-transmitting space for approximately ⅓. For reasons of vibration engineering, therefore, it can be advisable to increase the mass moment of inertia at the intermediate part by adding additional mass. A relatively high mass moment of inertia is also present at the takeoff. If the clutch device is designed as a dual clutch with fluid flowing through it, the mass moment of inertia can be on the order of approximately. 0.09 kgm². This value, too, can be increased if desired, possibly by the use of additional weights, which are advisably fastened to the clutch device.

If, for the reasons given above, additional mass is required on the intermediate part to increase the mass moment of inertia, this mass is preferably installed inside the damping space so as not to interfere with the goal of the torsional vibration damper, namely, to minimize the amount of space required.

Under certain operating conditions, the present torsional vibration damper may be exposed to torsional vibrations which are much stronger than those expected under normal operating conditions. In these cases, a small, defined amount of slip can be introduced into the clutch device to smooth out the maxima of these torsional vibrations. The remaining component of the torsional vibrations can be easily absorbed by the damping units of the torsional vibration damper.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

The attached sole FIGURE shows the upper half of a longitudinal cross section through a torsional vibration damper.

DETAILED DESCRIPTION OF THE PRESENTLY PREFERRED EMBODIMENTS

A torsional vibration damper 61 and a clutch device 58, which are able to rotate jointly around an axis of rotation 124, are installed in a gearbox housing 1 of a motor vehicle. The torsional vibration damper 61 is attached by the use of fasteners such as bolts 5 to a drive 3, indicated only schematically, which can be formed by the crankshaft of an internal combustion engine. A drive housing 126, such as an engine block, in which the drive 3 is rotatably supported, is also indicated only schematically.

The fasteners 5 attach a radial flange 7 to the drive 3, where the radial flange 7, proceeding from the fasteners 5, extends radially outward and is then bent to form an axial extension 9. To the end of the extension facing away from the radial flange 7 a cover plate 11 is attached, which extends radially back inward again. The radial flange 7, the axial extension 9, and the cover plate 11 together form a damping space 13, in which damping elements 15 of a first damping unit 17 are housed, the damping elements 15 being supported radially on the outside by slide elements 19 against the axial extension 9. These slide elements 19 are spring cups or slide shoes such as those described in U.S. Pat. No. 5,307,710. Both on the radial flange 7 and on an intermediate plate 12, which extends radially inward from the axial extension 9 and is positioned axially between the radial flange 7 and the cover plate 11, are first actuating elements 20, one for each adjacent damping element 15 of the first damping unit 17, each of these damping elements 15 being supported at the other end against a drive-side drive element 21. The drive-side drive element 21 is realized on a first hub disk 23, which, together with a supplemental mass 29, is attached to a hub 25 by rivets 27. The hub 25 is provided with appropriate mounting openings 28 for the axial passage of the fasteners 5. The previously mentioned additional mass 29 is installed in the damping space 13, axially between the intermediate plate 12 and the cover plate 11.

A hub base 31 is provided at the radially inner end of the hub 25; this base 31 is mounted on a journal-like connecting section 33, especially on a radial area 36 in the center thereof, by means of a detachable connection in the form of sets of teeth 35, which allow a certain amount of radial play. As a result of this detachable connection, there is both freedom of axial movement and a certain freedom of radial movement, although this latter freedom is very small, being limited by the amount of play available. At the same time, the hub 25 and the connecting section 33 are unable to rotate with respect to each other in the circumferential direction. The hub 25 and the first hub disk 23 carrying the drive-side drive elements 21 together form the drive-side section 32 of the intermediate part 48, to which the connecting section 33 and a takeoff-side section 45 of the intermediate part 48, provided on the end of the connecting section facing away from the drive-side section 32 of the intermediate part, also belong. This section 45 of the intermediate part 48 is designed as an essentially radially outward-extending, second hub disk 43 and is attached to the connecting section 33 by a joint 41, such as a welded joint.

Extending axially between the drive-side section 32 of the intermediate part 48 and the takeoff-side section 45 of the intermediate part 48 is a sealing wall 37, which forms a seal against the gearbox housing 1 at its radially outside end, whereas radially on the inside it has an opening 38 to allow the passage of the connecting section 33. In the area of the radial extension of the opening 38, the sealing wall 37 is provided with a seal 39 and with a bearing 40, both the seal 39 and the bearing 40 being supported on the radial area 36 in the center of the connecting section 33. The corresponding axial area of the connecting section 33 is referred to below as the "penetration area" 42. The seal 39 is intended to create a fluid-tight separation between the drive-side section 32 of the intermediate part 48 and its takeoff-side section 45, whereas the bearing 40 is designed to center the intermediate part 48 versus the sealing wall 37. The intermediate part 48 itself is centered radially by a bearing 128 on a first takeoff shaft 70, which for its own part centers a second takeoff shaft 84, which in turn is surrounded, by a takeoff hub 65, which leaves a certain gap in the radial direction to create a supply line 100.

The takeoff-side section 45 of the intermediate part 48 is provided in its radially outer area with takeoff-side drive elements 47, which serve to actuate a second damping unit 50. The latter is surrounded radially on the outside and on the side facing away from the drive 3 by a housing cover 56, to the drive side of which a radially inward-extending cover plate 59 is attached. The radially outer part of the housing cover 56 supports the second damping unit 50 in the radial direction by way of slide elements 54, which are provided radially between the damping elements 52 of the second damping unit 50 and the outer part of the housing cover 56. These slide elements 54 are also based on the pattern of U.S. Pat. No. 5,307,710 and function in the same way. Second actuating elements 60 are provided both on the takeoff-side radial part of the housing cover 56 and on the cover plate 59—in both cases on the side facing the second damping unit 50. After actuation of the second damping unit 50 by the takeoff-side drive elements 47, the damping elements 52 are supported against their assigned second actuating elements. The second damping unit 50 and the first damping unit 17 together form the damping device 51 of the torsional vibration damper 61.

Torque introduced by the drive 3 via the damping units 17, 50 to the housing cover 56 leads to a deflecting movement of the housing cover 56 around the axis of rotation 124. On the takeoff side, radially inside the second damping unit 50, the housing cover 56 has several openings 62 spaced around the circumference, which extend essentially in the radial direction and through which radially oriented tongues 63 of the radially outer carrier 67 of outer plates pass essentially without circumferential play. The tongues 63 and the openings 62 cooperate to form a connection for rotation in common 64 between the housing cover 56, which is assigned to the torsional vibration damper 61, and the radially outer carrier 67 of outer plates, which is assigned to the clutch device 58, and which is attached radially on the inside to the takeoff hub 65 by means of, for example, a weld.

The radially outer carrier 67 of outer plates can be brought into connection for rotation in common with the radially inner carrier 68 of outer plates by appropriate actuation of a first piston 72, which acts against the force of a first axial spring 74 and on the radially outer plate package 66. To actuate the first piston 72, control inlets are provided, only one of these control inlets 98 being shown in the drawing. This inlet 98 is provided to supply a pressure chamber 99, via which the first piston 72 can be moved against the action of the first axial spring 74 toward the radially outer plate package 66, which has the effect of engaging the plates by pressing the individual plates together. Each of the control inlets can be supplied by its own control line; only the control line 96 assigned to the control inlet 98 is shown in the drawing. Fluid is supplied to the control line 96 from an external pressure source, not shown in the drawing. The first piston 72 can be disengaged by releasing the pressure at the control inlet 98. Thus the first axial spring 74 will be able to push the first piston 72 back into its starting position, shown in the attached sole FIGURE. The components of the clutch device 58 described thus far form a first clutch unit 76.

Radially inside this first clutch unit 76, the inner plate carrier 68 of which is mounted nonrotatably on the first takeoff shaft 70 by a hub 69, the rotational movement taken up by the radially outer carrier 67 of the outer plates from the torsional vibration damper 61 can be transmitted to the first takeoff shaft 70. Radially inside the first clutch unit 76 there is a second clutch unit 90, with a radially outer carrier 78 of inner plates and a radially inner carrier 81 of inner plates, which can be brought into working connection with each other by a radially inner plate package 80 when the pressure in a pressure space 101 is increased via a control inlet (not shown), the second piston 86 thus being engaged against the force of a second axial spring 88. To disengage the second piston 86, the pressure in the pressure space 101 is released. Each of the two clutch units 76, 90 can also be disengaged by applying positive pressure to a space on the side of the piston 72, 86 facing away from the associated pressure space 99, 101.

When the second clutch unit 90 is engaged, the torque present at the radially outer carrier 67 of outer plates and thus at the takeoff hub 65 is transmitted from the takeoff hub 15 to the radially outer carrier 78 of inner plates, which transmits this torque via the radially inner plate package 80 to a hub 82. Because this hub 82 is connected for rotation in common to the second takeoff shaft 84, the torque is thus ultimately transmitted to the latter. Additional details concerning the design and function of a clutch device 58 of this type with two clutch units 76, 90, called a "dual clutch" in professional circles, can be derived from the previously cited DE 100 34 730 A1. No further explanation of the clutch device is required here.

Both the second damping unit 50 and the two clutch units 76 and 90 are installed in a space which is closed off radially on the outside essentially by the housing cover 56 and the cover plate 59. On the drive side, it is closed off essentially by the ring-shaped, takeoff-side section 45 of the intermediate part 48, and on the takeoff side it is closed off essentially by the housing cover 56 in conjunction with the radially outer carrier 67 of outer plates. This space is referred to below in brief as the "torque-transmitting space" 94, and fluid flows through it. This fluid is introduced from a pressure source (not shown) via supply lines and inlets into the torque-transmitting space 94. Only one such supply line 100 and only one inlet 102 are indicated in the drawing. This fluid, which is intended to serve essentially to cool the plate packages 66, 80 of the two clutch units 76, 90, flows radially outward and is thus available as a damping medium in the area of the radial extension of the second damping unit 50 before it leaves the torque-transmitting space 94 again through the outlet 104.

Because the second damping unit 50 is located in the radially outer area of the torque-transmitting space 94, room is available for a large deformation volume of the damping elements in the circumferential direction, which means that the takeoff-side section 45 of the intermediate part 48 and the takeoff 92, which is formed essentially by the housing cover 56 and the clutch device 58, are able to deflect around large angles of rotation relative to each other. In addition, because of the presence of the fluid, deformations of the damping elements 52 can be counteracted in a velocity-proportional manner. Thus the second damping unit 50 makes it possible to realize decoupling of superior quality and good damping behavior at the same time.

Because it has a smaller radius than the second damping unit 50 and because it is installed in an at least essentially dry damping space 13, the first damping unit 17 suffers from a certain functional limitation, but the first damping unit 17 is nevertheless advantageous because it filters out the worst maxima of the torsional vibrations between the drive 3 and the second damping unit 50. Even though the volume of its damping elements 15 in the circumferential direction is less than that of the second damping unit 50, it still improves the overall decoupling quality of the torsional vibration damper 61. Because of its radially limited dimension, furthermore, the first damping unit 17 can offer significant space advantages, especially in the axial direction, as will be explained below.

When the torsional vibration damper 61 and the clutch device 58 are combined with a starter-generator unit 114, especially a unit with a rotor 109 designed as an internal rotor, a "problem space" is created, which is surrounded by this rotor 109. Because the radial dimensions of this space are so small, it is difficult to make use of it, and it therefore must often remain empty and unused. Because of its small radial dimensions, the first damping unit 17 can remedy this situation. That is, the first damping unit 17 is small enough to fit into the problem space, where it can be connected nonrotatably to the rotor 109. If, as in the case of the exemplary embodiment shown here, the width of the damping space 13 is designed to match at least essentially the width of the rotor 109 of the starter-generator unit 114, almost all of the problem space can be used in the axial direction as well, which is true especially when the additional mass 29 is integrated into this damping space 13, which can be necessary to increase the mass moment of inertia of the intermediate part 48. To this extent, the first damping unit 17 makes a significant contribution to an axially compact design.

Additional advantages of the first damping unit 17 are obtained in conjunction with the detachable connection 35 between the hub base 31 of the drive-side section 32 of the intermediate part 48 and the connecting section 33.

Thus, especially when this detachable connection 35 is designed with a predetermined amount of radial play, wobbling movements which are introduced by the drive 3 to the first damping unit 17 can be compensated before they can be transmitted to the connecting section 33 and thus to the second damping unit 50. These wobbling movements are caused during radial deflections of the drive 3 transversely to the axis of rotation 124 and can cause damage to the bearings in the clutch device 58 such as at the bearing 40 and/or the bearing 128.

As a result of the detachable connection 35, a drive-side module 130, formed by the damping space 13 with the first damping unit 17 and the drive-side section 32 of the intermediate part 48, can be mounted at the drive 3 by the use of the fastening means 5 in a first production step. Then, in a second production step, a takeoff-side module 132 assigned to the connecting section 33 can be installed. This takeoff-side module 132 contains, in addition to the previously mentioned connecting section 33, the takeoff-side section 45 of the intermediate part 48, the second damping unit 50, and the takeoff 92 comprising the clutch device 58, and is pushed into its final position, shown in FIG. 1, by movement in the axial direction. This guarantees that the entire arrangement can be assembled easily.

The previously mentioned starter-generator unit 114 includes not only the rotor 109, which has both a plate package 106 and magnets 108, which surround the plates 106, but also a stator 110, on which coil windings 112 are provided. The stator 110 is mounted in a carrier element 116, which is attached to a mounting block 118, and which also has cooling channels 117. The mounting block 118 for its own part can be part of the gearbox housing 1 and serves to connect the latter to the drive housing 126. If the drive housing 126 is made of light metal such as aluminum, an intermediate wall 120 can be inserted as a way of effectively avoiding the electrochemical corrosion caused by contact between the components. This intermediate wall 120 can be made of from standard commercial sheet metal.

In spite of the indisputably high decoupling quality of the torsional vibration damper 61, it is still possible for torsional vibrations of such high intensity to occur—especially under critical operating conditions, such as during operation in pull mode under full load, especially at low rpm's—that additional damping can prove necessary. For this purpose, a control unit (not shown) can be used to reduce the pressure slightly in the pressure spaces 99, 101 and thus reduce the pressure acting on the engaged pistons 72, 86. The decrease in the force being exerted by the pistons allows the clutch units to slip, the degree of which is limited in both time and effect. As a result, at least the maxima of the torsional vibrations can be flattened slightly. As long as the speed difference caused by the slip is less than approximately 20 rpm, there will be no need to fear the occurrence of either thermal or wear-induced damage to the associated clutch units 76, 90. A control strategy of this type for the clutch units 76, 80 therefore makes it possible to provide yet another increase in the decoupling quality of the torsional vibration damper 61 without having to make any modifications to the design of the device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper for mounting in a gearbox housing between a drive and a clutch device, the torsional vibration damper comprising:
   a first damping unit disposed in a damping space which is free of fluid feed and discharge lines;
   an input part connecting the first damping unit to the drive;
   a second damping unit;
   an output part connecting the second damping unit to a takeoff;
   an intermediate part comprising a drive-side section having drive-side drive elements connected to the first damping unit, a takeoff-side section having takeoff-side drive elements connected to the second damping unit, and a connecting section connecting the drive-side section and the takeoff-side section, the intermediate part transmitting torsional vibrations between the first and second damping units,
   wherein the takeoff-side drive elements, the second damping unit and the takeoff are mounted in a torque-transmitting space of the clutch device, said torque transmitting space being provided with at least one fluid inlet and at least one fluid outlet;
   a sealing wall disposed between the damping space and the torque-transmitting space, the sealing wall being arranged radially outside of the connecting section, the sealing wall forming an opening between the sealing wall and a penetration area of the connecting section of the intermediate part; and
   a seal in the opening, the sealing wall having an outer radial side resting sealingly against the gearbox housing, and an inner radial side holding the seal, such that the sealing wall prevents fluid in the torque transmitting space from entering the damping space.

2. The torsional vibration damper of claim 1, wherein the first and second damping units have a common axis of rotation, the first damping unit being radially closer to the axis of rotation than the second damping unit.

3. The torsional vibration damper of claim 2, wherein the second damping unit is disposed radially outside of the clutch device and overlaps at least a substantial portion of the clutch device axially.

4. The torsional vibration damper of claim 1, further comprising a bearing disposed between the sealing wall and the connecting section and adjacent to the seal, the bearing centering the sealing wall on the penetration area of the connecting section.

5. The torsional vibration damper of claim 4, wherein the bearing is disposed on a side of the seal facing the torque-transmitting space.

6. The torsional vibration damper of claim 1, wherein a radial area in the center of the intermediate part constitutes the connecting section, and the drive-side section and the takeoff-side section extend radially outward from the connecting section.

7. The torsional vibration damper of claim 1, wherein the connecting section is provided on the takeoff-side section and connected nonrotatably but with freedom of axial movement to the drive-side section by a detachable connection.

8. The torsional vibration damper of claim 7, wherein the detachable connection comprises a plurality of teeth on the connecting section, and a plurality of teeth on the drive-side section, which slidably engage the teeth on the connecting section.

9. The torsional vibration damper of claim 7, wherein at least part of the connecting section is surrounded by the drive-side section.

10. The torsional vibration damper of claim 7, wherein the drive-side section, the damping space and the first damping unit form a drive-side module, the takeoff-side section, the second damping unit and the clutch device form a takeoff-side module, and the connecting section is part of the takeoff-side module and is connected to the drive-side module by the detachable connection.

11. The torsional vibration damper of claim 1, wherein the drive-side section and the takeoff-side section have different radial dimensions proceeding from the connecting section.

12. The torsional vibration damper of claim 1, wherein the gearbox housing in which the torsional vibration damper is mountable includes a starter-generator unit, the first damping unit is spaced axially from the second damping unit and configured to be disposed radially inside of the starter-generator unit mounted in the gearbox housing, and the second damping unit is configured to be disposed in an area of a radial extension of the starter-generator unit.

13. The torsional vibration damper of claim 1, wherein the drive-side section is operable to hold a supplemental mass inside the damping space.

14. The torsional vibration damper of claim 1, wherein the clutch device comprises at least one clutch unit, which is operable to slip under a predetermined operating condition to increase damping quality of the second damping unit.

* * * * *